Dec. 5, 1967 H. H. FARMER ET AL 3,356,702
MOLYBDENUM OXYSULFIDE DITHIOCARBAMATES
AND PROCESSES FOR THEIR PREPARATION
Filed Aug. 7, 1964
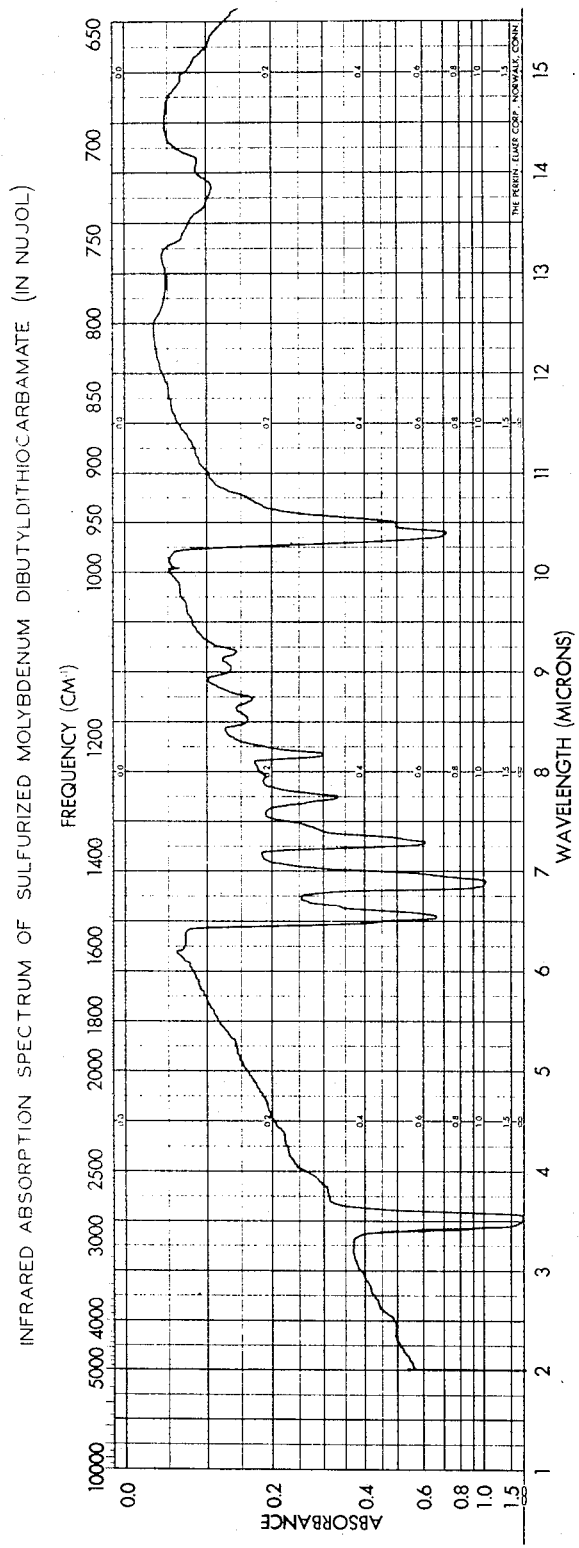
INVENTORS
HOMER H. FARMER
EUGENE V. ROWAN
ATTORNEYS

United States Patent Office 3,356,702
Patented Dec. 5, 1967

3,356,702
MOLYBDENUM OXYSULFIDE DITHIOCARBAMATES AND PROCESSES FOR THEIR PREPARATION
Homer H. Farmer, Westport, and Eugene V. Rowan, Rowayton, Conn., assignors to R. T. Vanderbilt Company, Inc., New York, N.Y., a corporation of New York
Filed Aug. 7, 1964, Ser. No. 388,110
11 Claims. (Cl. 260—429)

This invention relates to a new composition of matter useful as an extreme pressure agent, antioxidant and wear inhibitor for lubricants, and in particular to dialkyldithiocarbamates of molybdenum.

Compounds considered, on the basis of elemental analysis, to correspond to the general formula $$MoO_2(SCSNR_2)_2$$

have been reported by Malatesta (Gaz. Chim. Ital., 69, 752–62 (1939)) to form when an alkaline mixture of a soluble molybdate and a soluble dithiocarbamate are treated with a dilute acid. Yellow $MoO_3(HSCSNEt_2)_2$ was reported by Kul'berg et al. (Doklady Akad. Nauk. S.S.S.R., 98, 79–81 (1954)) to form when concentrated aqueous ammonium molybdate reacts with sodium diethyldithiocarbamate in neutral or weakly acidic medium, but when the molybdate was first warmed to 60–70° C. and then strongly acidified with N hydrochloric acid, a product having the same elementary composition but a red-violet color and giving qualitative tests for both Mo(III) and Mo(V) was formed.

It has now been discovered, in accordance with the present invention, that a new class of dithiocarbamates can be prepared which contains oxygen and more sulfur than can be attributed to the dithiocarbamate groups alone, thus differing from the molybdenum dithiocarbamates of the prior art. The new compounds are yellow in color, crystalline, fusible, and they have many of the indicia of pure compounds. While different preparations of the same compound vary slightly in elemental analysis, their infrared spectra are essentially identical and their melting points fall within the same narrow range. The proportions of oxygen and sulfur also fall within a restricted and definite range.

It has been found that the general formula of the compounds varies from $$[R_2N\!-\!CS\!-\!S\!-\!]_2Mo_2O_3S$$

to $$[R_2N\!-\!CS\!-\!S\!-\!]_2Mo_2O_2{\cdot}_{35}S_1{\cdot}_{65}$$

that is within the framework of the general formula $$[R_2N\!-\!CS\!-\!S]_2Mo_2O_mS_n$$

where $m+n=4$, $m$ is in the range 2.35 to 3 and $n$ is in the range 1.65 to 1, and R is an unsubstituted hydrocarbon group having 1 to 24 carbon atoms. In general, the group R is defined as being an unsubstituted hydrocarbon group (such as alkyl or alkenyl) of any of the secondary amines (R—NH—R) that will react with carbon disulfide to form dithiocarbamates. Such amines are well known in the prior art.

In the compound in which R is $C_4H_9$ (normal butyl) the final product has a very narrow melting range, that is 254–258° C. and it cannot be separated into components by thin layer chromatography. Although the analytical results do not fit exactly the formula of any single dithiocarbamate, the results show that there is always one dithiocarbamate residue per molybdenum atom and that the molybdenum has an effective valence of 5. It is not known whether each of the two molybdenum atoms present in the sulfurized dithiocarbamate molecule has a valence of 5 or one has a valence of 4 and the other 6.

The sulfurized molybdenum dialkyldithiocarbamates correspond to a mixture which might possibly be represented by:

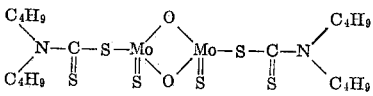

and

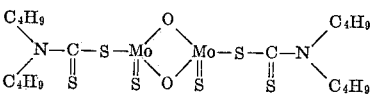

That the products are complexes or compounds which vary only slightly in their structure is shown by the fact that their infrared spectra are essentially identical no matter how the material is prepared and by the fact that melting points are quite sharp and the products cannot be separated into individual components by the techniques of thin layer chromatography.

FIGURE 1 is the infrared absorption spectrum of sulfurized molybdenum dibutyldithiocarbamate prepared by the procedure of Example 1, using the Nujol mull technique and a Perkin-Elmer double beam spectrophotometer. Sulfurized molybdenum dibutyldithiocarbamate absorbs strongly at 3.5 (Nujol), 6.55, 6.85 (Nujol), 7.30 (Nujol) and 10.35 microns; moderately at 7.75, 8.20 and 10.50 (shoulder) microns; and weakly at 8.50, 8.75, 9.05, 9.20, 13.85 and 14.15 microns.

The sulfurized molybdenum dialkyldithiocarbamates of the invention can be prepared by two different general procedures. In one procedure molybdic oxide $MoO_3$ is converted to soluble molybdate by dissolving it in an alkali metal hydroxide solution or in ammonium hydroxide, and filtering to remove any impurities present if crude $MoO_3$ is used as the source of molybdenum. The molybdate solution is neutralized to litmus by the addition of acid, then the secondary amine and carbon disulfide are added, and the mixture is heated.

In the second method, pure, solid $MoO_2$ or $MoO_3$ is placed in a polar solvent and the secondary amine and carbon disulfide are added. In some instances, the secondary amine itself may serve as the polar solvent. More detailed directions for preparing the sulfurized molybdenum dialkyldithiocarbamates of the invention are presented in the examples.

In the procedure of the prior art it has been observed that a reddish or red product is first formed at room temperature when either the metal oxide or the metal salt is reacted with the carbon disulfide and a secondary amine. This first or intermediate product is probably a conventional dithiocarbamate, as shown by its infrared spectrum, that is, the intermediate product shows the characteristic single absorption band at $10.35\mu$ associated with the conventional dithiocarbamate grouping of atoms. In accordance with the process of the present invention, however, the reaction mixture is heated at a temperature in excess of 90° C. and preferably above 100° C. to bring about the formation of the product of the present invention. Under these conditions it is believed that the substitution of an oxygen in the molybdenum-oxygen moiety by sulfur takes place. The substitution reaction takes place more readily when an excess of carbon disulfide (over that necessary to form conventional dithiocarbamates) is present.

The time during which the desired elevated temperature is maintained probably depends on both the nature of the secondary amine (or conventional dithiocarbamate probably formed as an intermediate) and the pot temperature of the reaction mixture. In the preparation of sulfurized molybdenum dibutyldithiocarbamate, the heating time given in the examples ranges from 2 hours when the reaction was carried out in butanol, 3.5 hours in dimethyl formamide, to 5.5 hours when carried out in water. The diethyl derivative has been made in 2 hours, the diamyl derivative in 3 hours, and the dilauryl derivative in 6 hours.

The preferred ratio of carbon disulfide to molybdenum to amine is 2:1:1.5 as reported in "Run No. 1" of the following table. A procedure in which the ratio of amine to molybdenum was kept at 1.5:1 while that of carbon disulfide to molybdenum was reduced to 1:1 is reported as Run No. 2" in the table. This was carried out by the sodium molybdate method. The reaction was carried out for 1.5 hours rather than the period of 5 hours used in the other examples described hereinafter. The yield of crude product was 31%. A sample was recrystallized from dimethyl formamide for analysis. In "Run No. 3" the ratio of carbon disulfide to molybdenum was kept at 2:1 and that of the amine to molybdenum was raised to 2:1. The reactants themselves were the solvents in this reaction. Again an analytical sample was recrystallized from dimethyl formamide. The yield was 72% of theoretical.

VARIATION OF YIELD OF SULFURIZED MOLYBDENUM DIALKYLDITHIOCARBAMATE WITH RATIO OF REACTANTS

| Run No. | Ratio $CS_2:Mo:Bu_2NH$ | Yield, Percent | M.P., °C. | Analysis | | | |
|---|---|---|---|---|---|---|---|
| | | | | S | N | C | H |
| 1 | 2:1:1.5 | 95 | 255–7 | 25.26 | | 32.71 | 6.00 |
| 2 | 1:1:1.5 | 31 | 257.3–258.4 | 23.86 | 3.98 | 31.61 | 5.40 |
| 3 | 2:1:2 | 72 | 257–8 | 24.49 | 4.00 | 31.56 | 5.42 |

The infrared spectra of the three products are essentially identical, that is the same functional groups and linkages are present in all of them. It is concluded that a change in ratio of reactants results in decreasing yield but no demonstrable difference in the product itself.

As polar solvents for the reaction, pyridine dimethylformamide, alcohols such as butanol and hexanol may be used. A more complete definition of the term will be found in "Concise Chemical and Technical Dictionary" Second Enlarged Edition, edited by H. Bennett and published in New York by Chemical Publishing Co., 1962, at page 743.

The following examples illustrate how the invention may be practiced.

EXAMPLE 1

*Sulfurized molybdenum dibutyldithiocarbamate from crude $MoO_3$*

Crude molybdic oxide ($MoO_3$ 90%, 0.5 mole, 80.1 grams) was slurried in 150 ml. water and treated with sodium hydroxide solution (0.437 mole, 35 grams of 50% solution), stirred for 30 minutes, and neutralized to litmus with 50% sulfuric acid. Filtration yielded 8 grams of residue, the impurities from the crude $MoO_3$. The filtrate was placed in a 3-necked, 1-liter flask equipped with stirrer, thermometer and reflux condenser, and dibutylamine (0.75 mole, 97.2 grams) was added. Carbon disulfide (1 mole, 76 grams) was added dropwise to the mixture. The reaction mixture was refluxed for 5.5 hours at a pot temperature of 104° C., filtered, the filter cake washed with water and then with toluene to yield a yellow solid melting at 254–256° C.

Analysis (percent).—Mo, 28.70; S, 25.77; C, 31.42; H, 5.44; N, 4.10.

EXAMPLE 2

*Sulfurized molybdenum dibutyldithiocarbamate from pure $MoO_3$ in butanol medium*

Pure molybdic oxide (0.5 mole, 72 grams), dibutylamine (0.75 mole, 97.2 grams) and butanol (100 ml.) as solvent were placed in a 3-necked, 1-liter flask equipped with stirrer, thermometer and reflux condenser, and cooled to below 30° C. Carbon disulfide (1 mole, 76 grams) was dropped into the mixture with cooling; after the addition, the mixture was stirred for 30 minutes at room temperature, then refluxed for two hours at a pot temperature of about 105–110° C. Although pure butanol boils at 118° C., the lower pot temperature was due to the presence of the $CS_2$. The pot temperature rose as the $CS_2$ was consumed. The reaction mixture was filtered while hot, the filter cake washed with methanol, and dried to yield 166 grams of a yellow solid which melted at 255–257° C.

Analysis (percent).—Mo, 28.57, 29.01; S, 25.51; C, 31.58; H, 5.21.

EXAMPLE 3

*Sulfurized molybdenum dibutyldithiocarbamate from pure $MoO_3$ in dimethylformamide medium*

Pure molybdic oxide (0.5 mole, 72 grams), dibutylamine (0.75 mole, 97.2 grams), and dimethylformamide (100 ml.) as solvent were placed in a 3-necked, 1-liter flask equipped with stirrer, thermometer and reflux condenser, and cooled below 30° C. Carbon disulfide (0.75 mole, 57 grams) was added to the mixture dropwise, with cooling. After addition was complete, the reaction mixture was stirred for one hour at room temperature, then heated at 105° C. for 1.5 hours. Carbon disulfide (0.25 mole, 19 grams) was added to the reaction mixture dropwise with stirring and the reaction continued for an additional two hours at 105° C., then the flask was cooled and the contents filtered. The filter cake was washed with methanol and dried, yielding 165 grams of a yellow solid which melted at 255–257° C. (recrystallized from dimethylformamide).

EXAMPLE 4

*Sulfurized molybdenum diethyldithiocarbamate from pure $MoO_3$ in dimethylformamide medium*

Diethylamine (0.75 mole, 54.8 grams) was substituted for the dibutylamine in the procedure of Example 3. The reaction mixture was stirred for 30 minutes at room temperature, then heated at 105° C. for two hours, cooled, and filtered. The filter cake was washed with methanol and dried. A yellow solid melting above 300° C. was obtained in 142 gram yield.

Analysis (percent).—S, 33.19; C, 20.86; H, 3.75; N, 4.84.

EXAMPLE 5

*Sulfurized molybdenum diethyldithiocarbamate from $MoO_2$ in dimethylformamide medium*

The procedure of Example 4 was followed, substituting $MoO_2$ (0.5 mole, 64 grams) for the $MoO_3$. The yield was smaller than that obtained with $MoO_3$ and it contained unreacted $MoO_2$, but the infrared spectrum of the purified product was identical with that of the product of Example 4 in which $MoO_3$ was the source of molybdenum.

EXAMPLE 6

*Sulfurized molybdenum diamyldithiocarbamate, no added solvent*

Pure molybdic oxide (1.0 mole, 143 grams) and diamylamine (2.0 moles, 314 grams) were placed in a 3-necked, 2-liter flask equipped with stirrer, thermometer and reflux condenser. The mixture was heated to between 120° and 150° C. with stirring while carbon disulfide (2.0 moles, 152 grams) was added dropwise. The reaction mixture was heated and stirred for 3 hours after carbon disulfide addition was complete, then filtered. The residue was slurried with methanol and filtered again, yielding 342 grams of olive green solid. When purified by washing with acetone, the product was yellow and melted at 205–211° C.

EXAMPLE 7

*Sulfurized molybdenum dilauryldithiocarbamate in hexanol medium*

Pure molybdic oxide (0.5 mole, 72 grams), dilaurylamine (0.75 mole, 190.2 grams) and hexanol (300 ml.) were placed in a 3-necked, 1-liter flask equipped with stirrer, thermometer and reflux condenser, then carbon disulfide (0.75 mole, 57 grams) was added dropwise while cooling. After addition was complete, the reaction mixture was stirred for 15 minutes at room temperature, then refluxed for 6 hours, cooled, and filtered. The solid product was slurried with ammonium hydroxide and filtered to yield 225 grams of yellow solid.

Infrared absorption spectra were determined in the compounds prepared in the foregoing examples. Infrared absorption bands are located as shown in the following table.

EXAMPLE 8

*Sulfurized molybdenum di(oleyl-linoleyl) dithiocarbamate from pure $MoO_3$ in amyl alcohol solvent*

Pure molybdic oxide (0.5 mole, 72 grams) di(tall oil) secondary amine (Alamine 215 of General Mills) (0.75 mole, 390 grams), and amyl alcohol (20 ml.) as reaction medium, were placed in a 3-necked, 1-liter flask equipped with stirrer, thermometer and reflux condenser. Carbon disulfide (1.0 mole, 76 grams) was added dropwise to the mixture. After addition was complete, the reaction mixture was heated for two hours at 110° C., then the solvent was distilled at 145° C. The reaction product was cooled, slurried in methanol and filtered to obtain a crude product. Alamine 215, the secondary amine used in the synthesis, is a mixture of secondary amines derived from the mixture of amines obtained from tall oil fatty acids and containing predominantly the oleyl and linoleyl groups in nearly equal proportions.

In the following examples the sulfurized dithiocarbamates of the invention were tested for their effectiveness as extreme pressure agents, wear inhibitors, and antioxidants in various lubricating compositions. The preferred method of incorporating the additive in the composition is to pass the mixture three times through a three roll mill.

EXAMPLE 9

To separate portions of a lithium 12-hydroxy-stearate grease (containing a rust inhibitor as its only additive) was added a sulfurized molybdenum dialkyldithiocarba-

INFRARED ABSORPTION SPECTRA OF SULFURIZED MOLYBDENUM DIALKYLDITHIOCARBAMATES

| Diethyl | Dibutyl | Diamyl | Dilauryl |
|---|---|---|---|
| 3.5 doublet | 3.5 doublet | 3.5 doublet | 3.5 doublet (Nujol). |
| 6.5 strong | 6.55 strong | 6.5 strong | {6.5 strong. <br> {6.7 moderate. |
| 6.85 | 6.85 | 6.85 | 6.85 (Nujol). |
| 6.9 M shoulder | | | |
| 7.25 | 7.3 | 7.25 | {7.20 weak. <br> {7.25 (Nujol). |
| 7.4 moderate | | | |
| 7.8 M doublet | 7.75 M | {7.85 M <br> {8.05 M | }8.0 weak. |
| 8.35 M | 8.2 M | 8.25 M | |
| 8.7 W | {8.5 W} doublet <br> {8.75 W} | {8.55 M <br> {8.75 M | 8.15 W. |
| {9.15 W} doublet <br> {9.35 W} | {9.05 W} doublet <br> {9.2 W} | 9.15 M | |
| {10.35 S} doublet <br> {10.5 M} | {10.35 S <br> {10.5 M shoulder | {10.35 S <br> {10.5 M} doublet | {10.35 S <br> {10.45 M} doublet. |
| 11.0 W | | | |
| 11.85 W | | | |
| 12.90 W | | | |
| | 13.85 W | 13.6 W | 13.85 W. |
| 14.1 W | 14.15 W | 14.1 W | |

Legend: S=strong, M=moderate, W=weak.

Strong bands near 3.5, 6.85 and 7.25μ are those due to the C—C and C—H linkages of the hydrocarbon, Nujol, plus the effect of the hydrocarbon linkages in the alkyl groups of the dithiocarbamates, hence their intensity is not significant and has not been indicated. It will be noted that the 10.35μ band characteristic of the

or dithiocarbamate linkage has become a doublet, or in the case of the dibutyl compound, a shoulder at 10.5μ which is probably an unresolved doublet, indicating that there are other S linkages present than the usual dithiocarbamate sulfur.

mate in varying proportions. Sulfurized di-n-butyl, di-n-amyl and dilauryldithiocarbamates were used at 3% concentration based on the weight of the grease composition and the dilauryl compound was also tested at 6%. Another sample containing no sulfurized molybdenum dialkyldithiocarbamate served as untreated control.

The compositions so produced were subjected to the Timken Endurance Test in the Timken Lubricant Tester in which a hardened steel ring rotating at 800 r.p.m. is smeared with 0.5 gram of the test grease while a hardened steel block is pressed against it by a system of weights and levers. A ten-pound load was used, and the test was run for a maximum of 8 hours, or until the bearing seized. The time to failure was recorded in hours and minutes.

TIMKEN TESTS IN GREASE

| Alkyl Group | Control | Dibutyl | Diamyl | Dilauryl | Dilauryl |
|---|---|---|---|---|---|
| Percent in grease | 0 | 3 | 3 | 3 | 6 |
| Duration in—hrs.:min | <0:01 | 5:20<br>4:00 | 3:20<br>4:30 | <0:01<br>0:05<br><0:01 | 2:30<br>3:12<br>2:30 |

SHELL 4-BALL TESTS IN GREASE

| | Control, No Additive | With 3% Dibutyl Additive |
|---|---|---|
| Wear Test, 2 hours maximum, 1,800 r.p.m., 40-kg. load: | | |
| Wear scar diam., mm | 1.01 | 0.38 |
| Pressure at this diam., p.s.i | 29,300 | 200,000 |
| Temperature rise, °F | 76 | 42 |
| Extreme Pressure Test, one minute: | | |
| Weld load, kg | 126 | 251 |

EXAMPLE 10

The compositions of Examples 8 and 9 as well as sulfurzed molybdenum dibutyldithiocarbamate at 1%, and the diethyl derivative at 3% concentration were subjected to the Falex Wear Test. The composition from Example 8 (the oleyl-linoleyl compound) is the crude product. In the Falex Wear Test, a ¼-inch diameter steel rod is rotated at 290 r.p.m. between two steel V-blocks at a gauge load of 350 pounds. The test grease is smeared over the V-blocks, and the load is applied gradually over the first minute. The test is run for one hour maximum, or until the bearing seizes. Wear is determined by weighing the pin and the blocks to the nearest 0.2 mg. before and after the test, and the loss in weight is recorded. Friction is registered continuously on a Bourdon-type gauge and is recorded in inch-pounds in the table below.

EXAMPLE 12

The Norma-Hoffman test, ASTM D-942-50, was applied to all of the compositions of Example 10 except that containing 1% sulfurized molybdenum dibutyldithiocarbamate. Time required to produce a 25-pound pressure drop from 110 p.s.i. was recorded.

FALEX WEAR TESTS

| Alkyl Group | Percent in Grease | Duration, min. | Pin Weight Loss, mg. | Block Weight Loss, aver. mg. | Friction, inch-lb. |
|---|---|---|---|---|---|
| Control | 0 | 2-4 | | | |
| Diethyl | 3 | 60, 27 | 0.9 | 2.0 | 10, 7.5-11 |
| Dibutyl | 1 | 26 | | | |
| Do | 3 | 60, 60 | 1.8, 1.7 | 2.2, 2.4 | 7.0-8.5, 8.0-10.0 |
| Diamyl | 3 | 60, 60 | 0.8, 0.5 | 1.5, 1.9 | 4.5-6.5, 3.0-3.5 |
| Dilauryl | 3 | 20, 52 | | | 10.0-11, 8.0-11 |
| Do | 6 | 60, 60 | 0.5, 0.0 | 1.0, 0.3 | 4.5-5.5, 3.5-4.5 |
| Di(oleyl-linoleyl) | 3 | 60 | 275.5 | 5.5 | 9-40 |
| Do | 6 | 60 | 2.1 | 0.3 | 9 |

Greases containing sulfurized molybdenum dialkyldithiocarbamates of 4 or 5 carbon atoms per alkyl group at 3% concentration have good antiwear properties, while the dilauryl derivative having double that concentration also showed good wear characteristics.

EXAMPLE 11

Samples of base grease and grease containing 3% sulfurized molybdenum dibutyldithiocarbamate were tested in the Shell 4-Ball Machine, in which a ½-inch steel ball is rotated in contact with three similar balls which are clamped in a stationary position so as to provide three points of contact. In the wear test, a pressure of 40 kg. is applied to the ball, rotating at 1800 r.p.m., for two hours. Temperature rise is noted, and the diameter of the wear scar is measured and the pressure on this spot is calculated. In the extreme pressure test using the same equipment, increasing loads are applied for one minute each to the rotating ball, and the load at which the balls weld together is recorded. The results of these tests are summarized in the table below.

NORMA-HOFFMAN BOMB—OXIDATION TEST

| Alkyl Group | Percent in Grease | Hours to 25-lb. Pressure Drop |
|---|---|---|
| Control | 0 | 190 |
| Diethyl | 3 | 848, 984 |
| Dibutyl | 3 | 780, 672 |
| Diamyl | 3 | 780, 780 |
| Dilauryl | 3 | 864, 1,272 |

Thus it is shown that the sulfurized molybdenum dialkyldithiocarbamates not only protect uninhibited grease from oxidation, but that the dibutyl and the diamyl compounds at 3% concentration exert a surprisingly effective and dependable antiwear effect, the dibutyl compound having the better Timken Endurance Test.

EXAMPLE 13

The sulfurized molybdenum dibutyldithiocarbamate of the invention was compared with molybdenum disulfide, a well known solid lubricant widely used as an additive in lubricating greases. MoS$_2$ was incorporated into the lithium 12-hydroxystearate grease of Example 9 in concentrations of 2% and 3%, and the greases subjected to the Timken Endurance Test of Example 9, the Falex Wear Test of Example 10 and the Norma-Hoffman Bomb Oxidation Test of Example 12. The table below compares these values with those obtained using 2% and 3% sulfurized molybdenum dibutyldithiocarbamate greases and the base grease.

COMPARISON OF SULFURIZED MOLYBDENUM DIBUTYLDITHIOCARBAMATE WITH MOLYBDENUM DISULFIDE

| Test | No Additive | Additive at 2% | | Additive at 3% | |
|---|---|---|---|---|---|
| | | Mo-di-Bu-DTC | MoS$_2$ | Mo-di-Bu-DTC | MoS$_2$ |
| Timken Endurance Test, 10-lb. Load: Duration, hrs.:minutes | <0:01 | | | 5:00 | <0:01 |
| Falex Wear Test, 350-lb. Load, Maximum 1 hr.: | | | | | |
| Duration, minutes | 2.5 | 60 | ¹60 | 60 | 60 |
| Pin Wt. Loss, mg | | 0.1 | 0.5 | 0.8 | 0.8 |
| Block Wt. Loss, mg | | 2.0 | 2.2 | 1.8 | 1.6 |
| Friction, in.-lb | | 6 | 11 | 8 | 8 |
| Norma-Hoffman Bomb Oxidation Test: | | | | | |
| Pressure Drop in 100 hrs., lb | 7.8 | 6-8 | | 6 | >40 |
| Time to 25-lb. Pressure Drop, hrs | 190 | >600 | | 876 | 48 |

¹ Only 1 run in 3 lasted 60 minutes.

These data show that sulfurized molybdenum dibutyldithiocarbamate is vastly superior to molybdenum disulfide in equal concentration (3% each in the Timken Endurance Test). It is the equal of molybdenum disulfide at 3% in the Falex Wear Test and may exceed molybdenum disulfide at the 2% level of each, while in the Norma-Hoffman test, 3% of the sulfurized dithiocarbamate far surpasses molybdenum disulfide in antioxidant effect.

EXAMPLE 14

Diester base grease (bis(2-ethylhexyl) sebacate thickened with lithium 12-hydroxystearate) and the same grease containing 3% by weight of sulfurized molybdenum dibutyldithiocarbamate were submitted to the 4-Ball Wear Test of Example 11, using two different test loads. The following table reports the results of these tests as the average of the vertical and horizontal dimensions of the wear scars on all three balls:

| Sulfurized molybdenum dibutyldithiocarbamate concentration, percent | Load, kg. | Diameter of Wear Scar Average, mm. |
|---|---|---|
| 3 | 20 | 0.60 |
| 3 | 20 | 0.61 |
| 0 | 20 | 0.73 |
| 0 | 20 | 0.72 |
| 3 | 40 | 0.85 |
| 3 | 40 | 0.78 |
| 0 | 40 | 2.87 |
| 0 | 40 | Fail |

These data show that sulfurized molybdenum dibutyldithiocarbamate is an excellent antiwear agent in diester base, lithium soap greases.

EXAMPLE 15

The Norma-Hoffman Oxidation Test was applied to the diester base greases of Example 14. The table below compares the rate of oxidation as measured by oxygen pressure drop of grease containing 3% by weight of sulfurized molybdenum dibutyldithiocarbamate with that of the base grease:

| Sulfurized molybdenum dibutyldithiocarbamate concentration, percent | Pressure Drop in— | | Time to 5-lb. Drop, hrs. |
|---|---|---|---|
| | 100 hrs. | 500 hrs. | |
| 3 | 0 | 2 | 1,500 |
| 3 | 0 | 2 | 1,500 |
| 0 | 2 | 40 | 140 |
| 0 | 2 | 40 | 140 |

Sulfurized molybdenum dibutyldithiocarbamate is thus shown to be an excellent oxidation inhibitor in diester base grease.

We claim:

1. A compound having the general formula $$[R_2N\text{---}CS\text{---}S]_2Mo_2O_mS_n$$

where $m+n=4$, $m$ is in the range 2.35 to 3 and $n$ is in the range 1.65 to 1, and R is a hydrocarbon group having 1–24 carbon atoms such that the compound

will react with carbon disulfide to form a dithiocarbamate.

2. The compound described in claim 1 in which the group R is butyl and having an infrared absorption spectrum as shown in FIGURE 1.

3. The process of preparing the compound described in claim 1 which comprises mixing and reacting together in a polar organic solvent carbon disulfide, molybdic oxide and a secondary amine, $R_2NH$ which is capable of forming a conventional dithiocarbamate with $CS_2$ and such that R is a hydrocarbon group having from 1 to 24 carbon atoms, and maintaining said mixture at a temperature above 90° C. for a time sufficient to cause the formation of said compound.

4. The process of claim 3 wherein said group R is butyl.

5. The process of preparing the compound described in claim 1 which comprises mixing and reacting in aqueous solution, neutralized soluble molybdate selected from the class consisting of alkali metal molybdates and ammonium molybdate, with carbon disulfide and a secondary amine, $R_2NH$ which is capable of forming a conventional dithiocarbamate with $CS_2$, and R is a hydrocarbon group having 1 to 24 carbon atoms, and maintaining said mixture above 90° C. for a time sufficient to cause the formation of said compound.

6. The process of claim 3 in which the molar ratio of carbon disulfide to molybdic oxide to secondary amine is about 2:1:1.5.

7. The process of claim 5 in which the molar ratio of carbon disulfide to soluble molybdate to secondary amine is about 2:1:1.5.

8. The compound described in claim 1 in which the group R is ethyl.

9. The compound described in claim 1 in which the group R is amyl.

10. The compound described in claim 1 in which the group R is lauryl.

11. The compound described in claim 1 in which the group R is oleyl-linoleyl, said compound having been derived from di(tall oil) amine.

No references cited.

TOBIAS E. LEVOW, *Primary Examiner.*

A. P. DEMERS, *Assistant Examiner.*

UNITED STATES PATENT OFFICE
CERTIFICATE OF CORRECTION

Patent No. 3,356,702                        December 5, 1967

Homer H. Farmer et al.

It is hereby certified that error appears in the above numbered patent requiring correction and that the said Letters Patent should read as corrected below.

Column 2, lines 9 to 12, for that portion of the formula reading

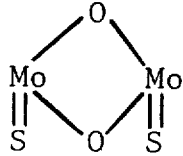        read        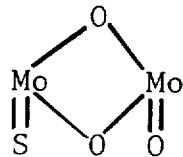

Signed and sealed this 18th day of February 1969.

(SEAL)
Attest:

Edward M. Fletcher, Jr.                        EDWARD J. BRENNER
Attesting Officer                                  Commissioner of Patents